United States Patent [19]

Ragon

[11] 4,383,718
[45] May 17, 1983

[54] LOW GROUND PRESSURE TRACK SHOE

[75] Inventor: Danny L. Ragon, East Dubuque, Ill.

[73] Assignee: Deere & Company, Moline, Ill.

[21] Appl. No.: 229,416

[22] Filed: Jan. 29, 1981

[51] Int. Cl.³ .............................................. B62D 55/20
[52] U.S. Cl. ......................................... 305/53; 305/39
[58] Field of Search .................. 305/35 R, 35 EB, 39, 305/53, 54

[56] References Cited

U.S. PATENT DOCUMENTS

| 1,391,140 | 9/1921 | Paulsen. | |
|---|---|---|---|
| 1,630,089 | 5/1927 | Leaks. | |
| 2,548,626 | 4/1951 | Sinclair | 305/10 |
| 3,278,244 | 10/1966 | Deffenbaugh et al. | 305/54 |
| 3,480,339 | 11/1969 | Kell | 305/35 EB |
| 3,937,529 | 2/1976 | Becker et al. | 305/54 |
| 4,094,557 | 6/1978 | Miller | 305/54 |
| 4,123,119 | 10/1978 | Stedman | 305/54 X |
| 4,141,601 | 2/1979 | Stedman | 305/54 |

FOREIGN PATENT DOCUMENTS

| 2607981 | 9/1977 | Fed. Rep. of Germany | 305/35 R |
|---|---|---|---|
| 421561 | 9/1974 | U.S.S.R. | 305/39 |

Primary Examiner—David A. Scherbel

[57] ABSTRACT

A low ground pressure track shoe includes a ground-engaging surface defined, in part, by downwardly converging arcuate surfaces having a radius of curvature, at various points along the length of the shoe, which is slightly less than the distance between the pivot connections of a track link with which the shoe is adapted for use. The ground-engaging surface has a central lowermost flat rectangular surface constituting approximately one-ninth of the vertically projected surface area of the shoe.

6 Claims, 6 Drawing Figures

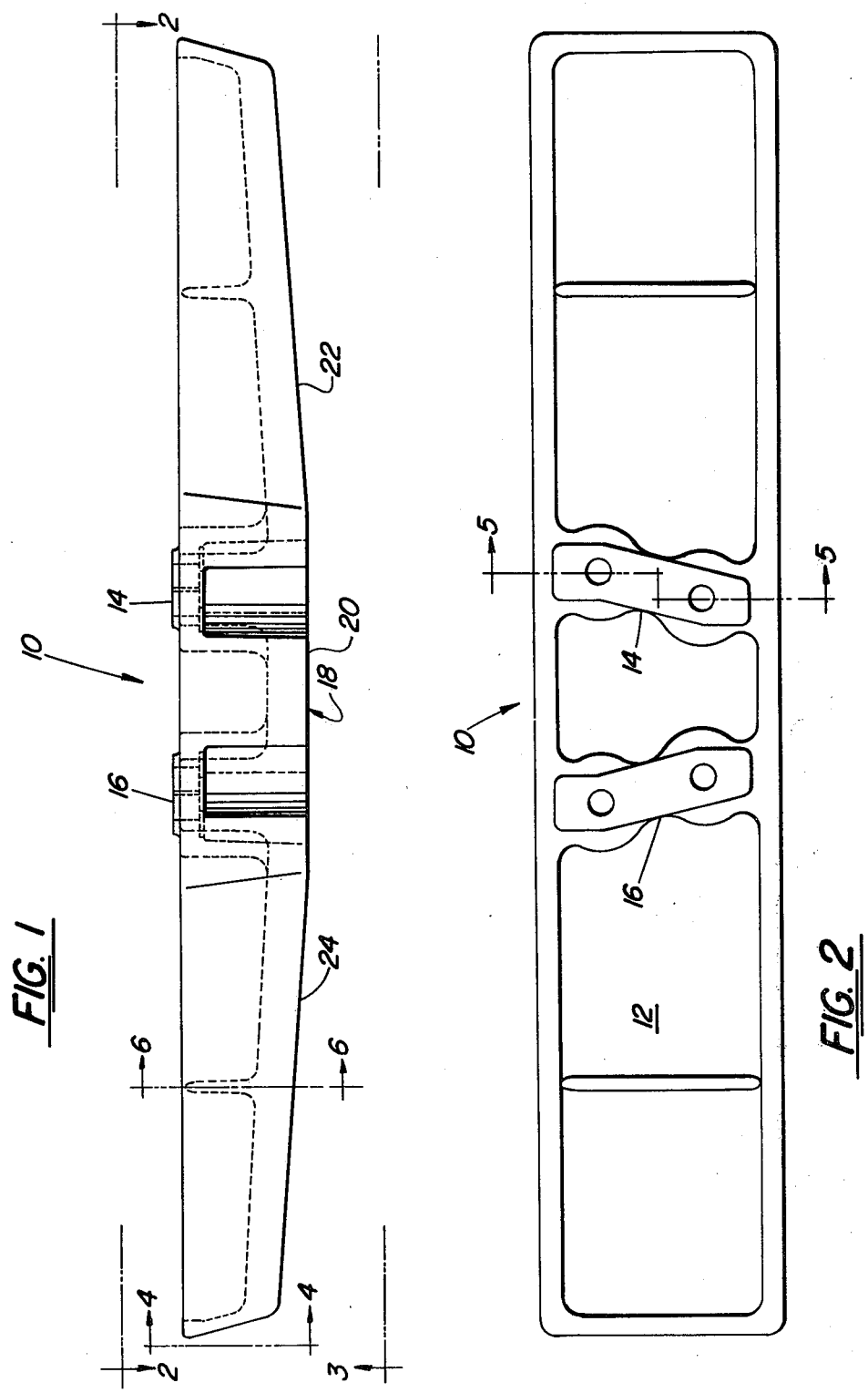

LOW GROUND PRESSURE TRACK SHOE

BACKGROUND OF THE INVENTION

The present invention relates to low ground pressure track shoes for track-laying vehicles.

It is common practice to equip track-laying vehicles with extra wide tracks to provide adequate floatation for operating the vehicle over swampy or extremely loose terrain. However, oftentimes, relatively firm or hard terrain also exists at the same site as does the swampy or loose terrain and heretofore, low ground pressure track shoes have had one or more shortcomings when operated over relatively firm or hard terrain. For example, some prior art shoe designs include a ground-engaging surface having an apex extending the length of the shoe and located in a vertical plane. When a track employing such shoes is engaged with hard material, the shoes tend to rock fore-and-aft on their apices as the track link joints move between adjacent track support rollers. This rocking results in flexure at the track joints which increases wear thereto and also results in the links impacting and causing increased wear to the rollers and further increasing the wear to the track link joints. While U.S. Pat. No. 3,278,244, issued to Deffenbaugh et al on Oct. 11, 1966, discloses a track shoe having a fore-and-aft arched apex for giving stability to the track shoe to eliminate the problem just discussed, the patented shoe shares another drawback with some prior art design shoes in that it effects high twisting forces in the chain when the vehicle is turned with the track being engaged with relatively firm or hard material.

SUMMARY OF THE INVENTION

According to the present invention, there is provided an improved low ground pressure track shoe.

An object of the invention is to provide a low ground pressure track shoe which exhibits good stability when engaged with hard ground while having a minimum of its length engaged with the ground so as to minimize twisting forces when turns are being made.

A further object is to provide a low ground pressure track shoe which leaves an undisturbed imprint as the shoe is elevated from ground contact to thereby minimize power consumption as would otherwise happen if the shoe were "stirring" the soil.

A more specific object is to provide a low ground pressure track shoe having a central rectangular lowermost ground-engaging surface which provides a stable support for the shoe when the shoe is in engagement with relatively hard or firm ground.

Yet another specific object is to provide a track shoe of the type mentioned in the immediately preceding object wherein flat, relatively narrow lowermost ground-engaging surface portions incline upwardly and forwardly from opposite ends of the central ground-engaging surface to the opposite ends of the shoe to thereby provide additional shoe support as the shoe imprints deeper in the soil while providing relief at the opposite ends and the central ground-engaging surface so as to minimize twisting forces during turns.

Still another object of the invention is to provide a low ground pressure track shoe having a ground-engaging surface formed and defined by forward and rearward, downwardly converging arcuate surfaces which have radii of curvature, at each point along their length, that are just slightly less than the distance between adjacent pivot pins of the track links to which the shoes are adapted to be secured.

These and other objects will become apparent from a reading of the ensuing description, together with the appended drawings.

BRIEF DESCRIPTION OF THE DRAWINGS

FIG. 1 is a rear elevational view of a low ground pressure track shoe constructed in accordance with the principles of the present invention.

FIG. 2 is a top view of the track shoe taken along line 2—2 of FIG. 1.

DESCRIPTION OF THE PREFERRED EMBODIMENT

Figure 4:
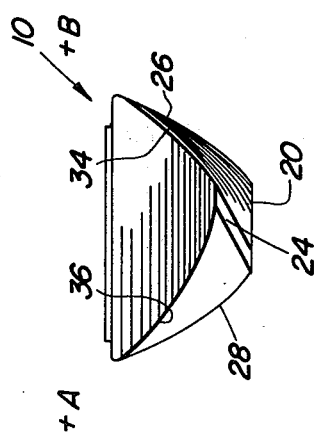
FIG. 4 is an end view of the track shoe taken along line 4—4 of FIG. 1.

Referring now to the drawings, therein is shown a low ground pressure track shoe 10, which is rectangular in outline, as viewed from above (FIG. 2). The shoe 10 includes a dished upper surface 12 partitioned by right- and left-hand track link mounting ribs 14 and 16, respectively, located in the central one-third of the shoe between opposite ends of the latter. Each of the ribs contains a pair of mounting holes for receiving bolts for anchoring the shoe to a pair of side-by-side track links (not shown) having bores in their opposite ends for receiving connecting elements for joining the link to adjacent links for relative pivotal movement about axes A and B (FIG. 4).

The track shoe 10 includes a ground-engaging surface 18 configured so as to provide a stable support base for an associated pair of links when the track embodying the shoe is operating on relatively firm or hard ground while at the same time, offering no more resistance than a regular track shoe so as to minimize twisting forces during turns, and so as to not undercut the soil and thereby unneccesarily consume energy as the shoe leaves the soil as it travels about the sprocket but rather so as to leave an undisturbed imprint.

Specifically, for providing a stable support base, the ground-engaging surface 18 includes a lowermost horizontal flat surface portion 20 dimensioned so as to have a length and a width that is approximately one-third of the length and width of the shoe and located centrally beneath the track link mounting ribs 14 and 16.

Figure 3:
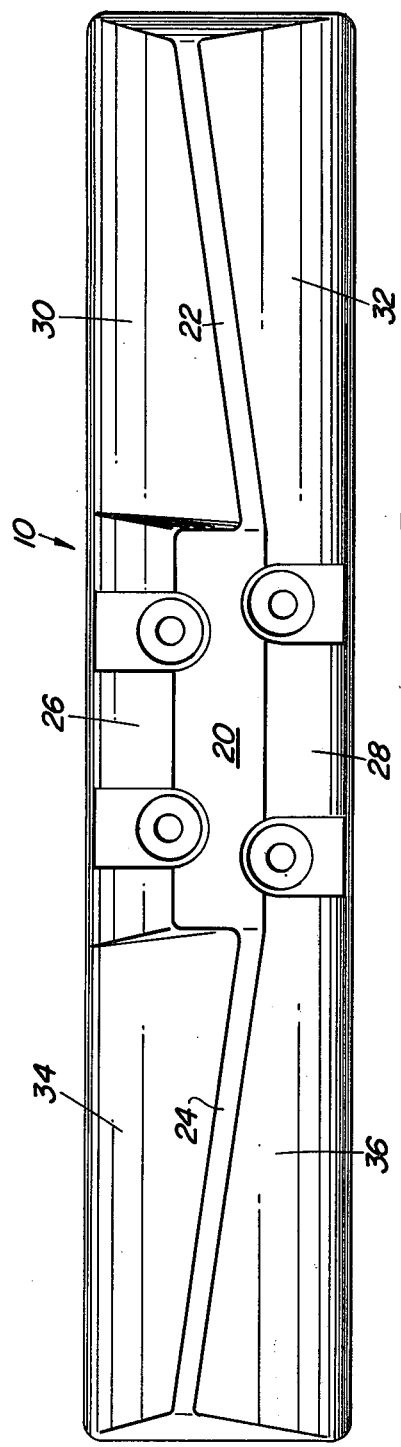
FIG. 3 is a bottom view of the track shoe taken along line 3—3 of FIG. 1.
Figure 6:
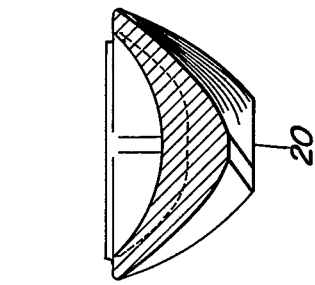
FIG. 6 is a vertical sectional view of the track shoe taken along line 6—6 of FIG. 1.
Figure 5:
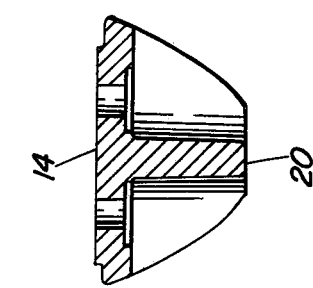
FIG. 5 is a vertical sectional view of the track shoe taken along line 5—5 of FIG. 2.

Joining the opposite ends of the surface portion 20 at locations thereof which are forward when the shoe is in ground engagement during operation and extending to opposite ends of the shoe are relatively narrow right- and left-hand flat surface portions 22 and 24 (FIG. 3) that, in order to minimize twisting forces during turns, are inclined upwardly from the surface portion 20 by approximately 5 degrees and are inclined forwardly such that the opposite ends of the right- and left-hand surface portions 22 and 24 are substantially even with the forward edge of the central surface portion 20. Thus, as the soil conditions get softer, the shoe will penetrate only to a depth sufficient enough to increase the bearing area to support the vehicle.

As can best be seen in FIG. 4, the central surface portion 20 connects the lower ends of forward and rearward downwardly converging arcuate surface portions 26 and 28, respectively, having centers of curvature on the axes A and B and formed at a radius which is slightly less than the distance between the axes A and B. The right-hand flat surface portion 22 interconnects the lower ends of downwardly coverging right-hand forward and rearward arcuate surface portions 30 and 32 while the left-hand flat surface portion 24 similarly interconnects the lower ends of downwardly converging left-hand forward and rearward arcuate surface portions 34 and 36. At any point along the length of the shoe 10, the surface portions 30-36 are curved at the same radius as are the central surface portions 26 and 28. Thus, as the shoe 10 is lifted from the ground by the drive sprocket and pivots about one or the other of the axes A and B, it leaves its imprint undisturbed since the curvatures of the various arcuate surface portions are approximately the same as the distance between the axes A and B.

The operation of the track shoe 10 is briefly as follows. Assuming the track shoe 10 is operating on relative hard or firm ground, the lowermost rectangular surface 20 will engage the ground and provide substantially the entire support for the track shoe. The dimension of the surface 20 in the direction of travel is sufficient to substantially eliminate any tendency of the shoe to rock thereon as the track support rollers pass over the shoe so impact on the rollers, as would result from a rocking action, is substantially eliminated. Also, the lower surface portions 22 and 24 will be elevated from the ground so that when the track shoe is skidded sideways, resisting forces are minimized to thereby minimize twisting forces imposed on the shoe.

As the shoe 10 is elevated from the ground by the drive sprocket, it will pivot about the pivot connection of the associated link with an adjacent link and due to the ground-engaging surface 18 of the link being defined by arcuate surfaces having a radius of curvature slightly less than the distance between the pivot connections at the opposite ends of an associated link, the surface 18 will leave the ground without scuffing the soil and disturbing its imprint and therefore operates in an energy-conserving manner.

I claim:

1. A low ground pressure track shoe, comprising: an elongate member being generally rectangular in plan view and having a ground-engaging bottom surface defined by downwardly converging opposite sidewalls joined together at their lower extremes by flat surface portions extending substantially the length of the member, said flat surface portions including a substantially rectangular horizontal portion located centrally between opposite ends and sides of the member and having dimensions respectively between opposite ends and opposite sides which are approximately one-third of the corresponding dimensions of the member in plan view; and said substantially rectangular portion of the flat surface portions being the lowermost surface of the track shoe.

2. The track shoe defined in claim 1 wherein the substantially rectangular portion of the flat surface is located in a first plane and first and second portions of the flat surface at opposite ends of the rectangular portion make respective angles of approximately 5 degrees with the first plane.

3. The track shoe defined in claim 1 wherein the opposite sides of the substantially rectangular portion of the flat surface are located in respective first and second parallel planes; said flat surface narrowing, at opposite ends of the rectangular portion, to no more than about one-fourth of the width of the rectangular portion and extending from the first to the second plane.

4. The track shoe defined in claim 3 wherein the rectangular portion lies in a third plane and the flat surface at the opposite ends of the rectangular portion make respective angles of about 5 degrees to the third plane.

5. The track shoe defined in claim 1 wherein the opposite side walls of the member are curved and have respective radii of curvature at any point along their lengths which are no greater than the distance between respective pivot axes of an associated track link and the point.

6. A low ground pressure track shoe, comprising: an elongate member being generally rectangular in plan view and having opposite bottom and top surfaces respectively adapted for ground engagement and for being secured to a pair of transversely spaced track links; said bottom surface including a lowermost portion defining a flat generally rectangular ground-engaging pad located substantially centrally in and being dimensioned so as to be approximately one-third of the length and width of the member; first and second flat ground-engaging surface portions respectively joined to the opposite ends of the pad and extending to opposite ends of the member; and said flat ground-engaging surface portions being inclined upwardly from the lowermost portion.

* * * * *